United States Patent
Schultz et al.

(10) Patent No.: US 11,194,158 B2
(45) Date of Patent: Dec. 7, 2021

(54) LIGHT GUIDE WITH BEAM SEPARATOR FOR DUAL IMAGES

(71) Applicant: Vuzix Corporation, West Henrietta, NY (US)

(72) Inventors: Robert J. Schultz, Victor, NY (US); Paul J. Travers, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 355 days.

(21) Appl. No.: 16/470,226

(22) PCT Filed: Dec. 13, 2017

(86) PCT No.: PCT/US2017/066188
§ 371 (c)(1),
(2) Date: Jun. 16, 2019

(87) PCT Pub. No.: WO2018/125576
PCT Pub. Date: Jul. 5, 2018

(65) Prior Publication Data
US 2019/0310482 A1    Oct. 10, 2019

Related U.S. Application Data

(60) Provisional application No. 62/440,948, filed on Dec. 30, 2016.

(51) Int. Cl.
*G02B 27/14* (2006.01)
*G09G 5/00* (2006.01)
(Continued)

(52) U.S. Cl.
CPC ........... *G02B 27/0172* (2013.01); *G02B 5/04* (2013.01); *G02B 5/18* (2013.01); *G02B 6/0026* (2013.01);
(Continued)

(58) Field of Classification Search
CPC ........ G02B 27/0172; G02B 5/04; G02B 5/18; G02B 6/0026; G02B 6/0076;
(Continued)

(56) References Cited

U.S. PATENT DOCUMENTS

| | | |
|---|---|---|
| 4,948,229 A | 8/1990 | Soref |
| 5,790,504 A | 8/1998 | Hayashi et al. |

(Continued)

OTHER PUBLICATIONS

International Search Report and Written Opinion for International Patent Application No. PCT/US2017/066188 dated Apr. 24, 2018.

*Primary Examiner* — William Choi
(74) *Attorney, Agent, or Firm* — Harter Secrest & Emery LLP

(57) ABSTRACT

An imaging apparatus has a projector apparatus that projects light for forming a first image and a second image. A first pupil expander lies in the path of projected light and is configured to direct light to a viewer to form a first virtual image at infinity focus. A second pupil expander lies in the path of the projected light and is configured to direct light through a first lens and to the viewer to form a second virtual image near a focal plane of the first lens. A second lens is disposed to condition light from a visual scene lying beyond the second pupil expander.

18 Claims, 15 Drawing Sheets

(51) Int. Cl.
*G02B 27/01* (2006.01)
*F21V 8/00* (2006.01)
*G02B 27/12* (2006.01)
*G02B 5/18* (2006.01)
*G02B 27/00* (2006.01)
*G02B 5/04* (2006.01)

(52) U.S. Cl.
CPC ....... *G02B 6/0076* (2013.01); *G02B 27/0081* (2013.01); *G02B 27/0179* (2013.01); *G02B 27/126* (2013.01); *G02B 6/005* (2013.01); *G02B 6/0011* (2013.01); *G02B 2027/0123* (2013.01); *G02B 2027/0125* (2013.01); *G02B 2027/0178* (2013.01); *G02B 2027/0185* (2013.01)

(58) Field of Classification Search
CPC ............ G02B 27/0081; G02B 27/0179; G02B 27/126; G02B 6/0011; G02B 6/005; G02B 2027/0123; G02B 2027/0125; G02B 2027/0178; G02B 2027/0185
USPC .......................... 359/629, 630, 633; 345/7–9
See application file for complete search history.

(56) References Cited

U.S. PATENT DOCUMENTS

| | | |
|---|---|---|
| 8,009,363 B2 | 8/2011 | Kuo et al. |
| 2004/0202415 A1 | 10/2004 | Ohmuro |
| 2004/0217464 A1 | 11/2004 | Denneau et al. |
| 2005/0094534 A1 | 5/2005 | Yoon et al. |
| 2012/0062998 A1 | 3/2012 | Schultz et al. |
| 2015/0103318 A1 | 4/2015 | Lee et al. |
| 2015/0172631 A1 | 6/2015 | Kasahara |
| 2016/0116755 A1 | 4/2016 | Lin |
| 2020/0183152 A1* | 6/2020 | Pennell .............. G02B 27/0075 |

\* cited by examiner

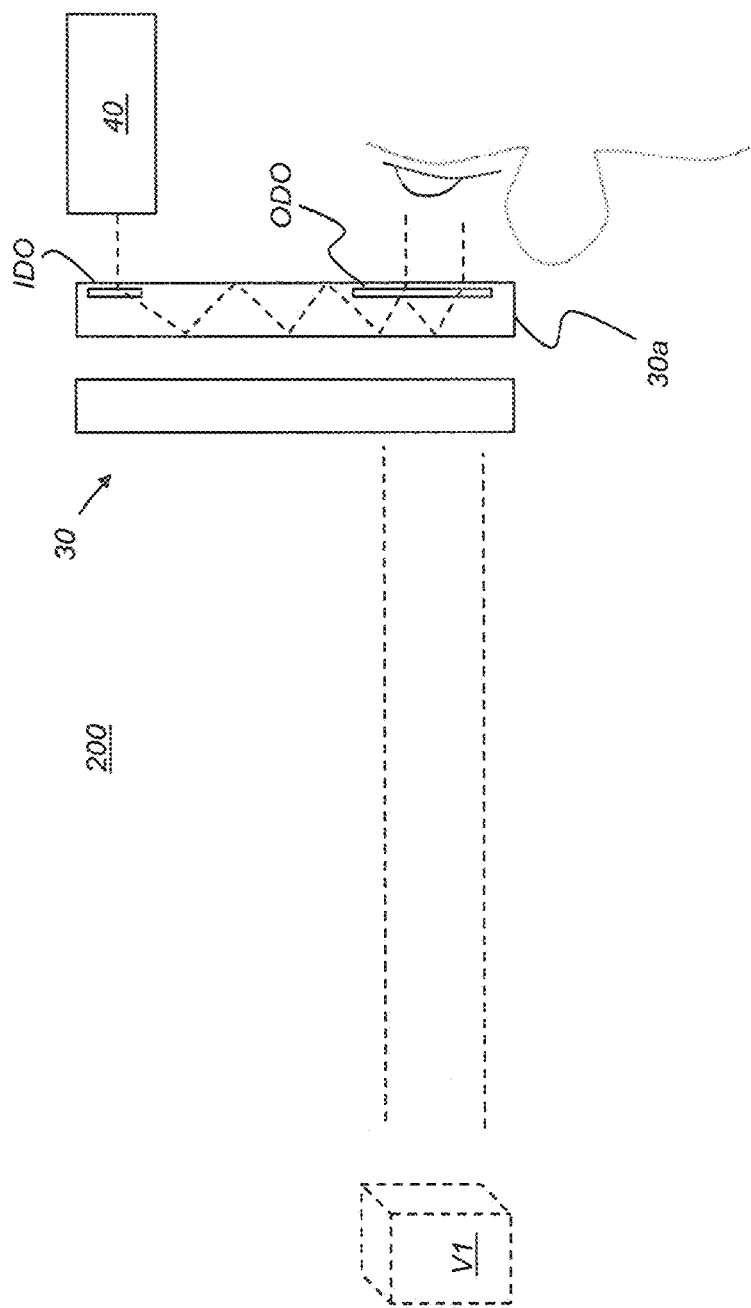

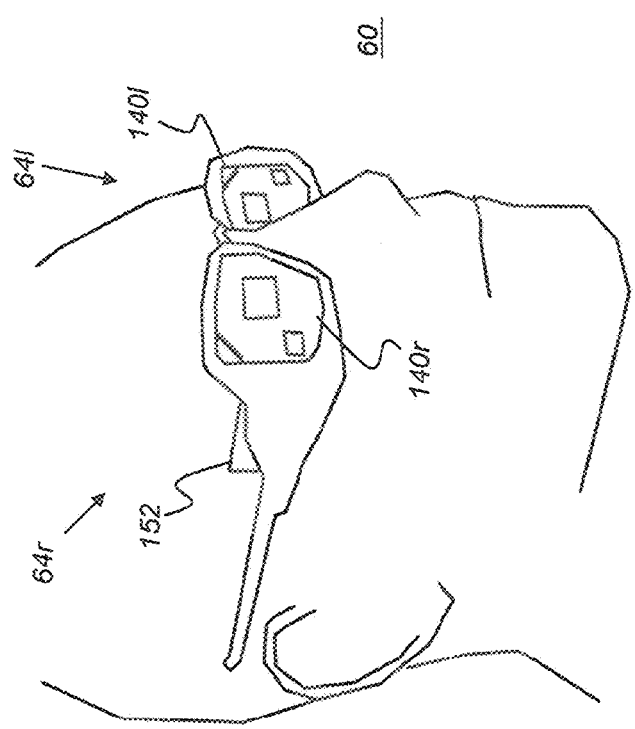

LIGHT GUIDE WITH BEAM SEPARATOR FOR DUAL IMAGES

TECHNICAL FIELD

This invention generally relates to electronic displays and more particularly relates to displays that use a planar imaging light guide with a beam separator to provide image-bearing light to a viewer.

BACKGROUND OF THE INVENTION

Head-Mounted Displays (HMDs) are being developed for a range of diverse uses, including military, commercial, industrial, fire-fighting, and entertainment applications. For many of these applications, there is particular value in forming a virtual image that can be visually superimposed over the real-world image that lies in the field of view of the HMD user. Optical imaging light guides convey image-bearing light to a viewer in a narrow space for directing the virtual image to the viewer's pupil and enabling this superposition function.

In such conventional imaging light guides, collimated, relatively angularly encoded light beams from an image source are coupled into a planar waveguide by an input coupling such as an in-coupling diffractive optic, which can be mounted or formed on a surface of the planar waveguide or buried within the waveguide. Such diffractive optics can be formed as diffraction gratings, holographic optical elements or in other known ways. For example, the diffraction grating can be formed by surface relief. After propagating along the waveguide, the diffracted light can be directed back out of the waveguide by a similar output grating, which can be arranged to provide pupil expansion along one dimension of the virtual image. In addition, a turning grating can be positioned along the waveguide between the input and output gratings to provide pupil expansion in an orthogonal dimension of the virtual image. The image-bearing light output from the waveguide provides an expanded eyebox for the viewer.

Conventional imaging light guides form a virtual image at optical infinity, conveying only collimated light to the viewer eyebox. However, there can be advantages to forming the virtual image at some close distance, such as in the range from 1 m to 1.5 m, for example. There can be particular benefits to a head-mounted optical imaging apparatus with an imaging light guide that forms both a conventional virtual image at infinity and another virtual image at a near distance from the viewer. At the same time, the apparatus should provide good visibility of the real-world scene that lies in the viewer's field of view. Solutions that have been proposed for providing this feature include bulky designs that require multiple image-forming components and employ complex timing schemes in order to present both near field-focused and infinity-focused images.

In order to provide two separate images to the viewer, multiple image sources could be used. However, this type of solution can be difficult to implement in a lightweight, wearable viewing apparatus. Thus, there would be advantages to a solution that employs a single image source for providing image content at different focal lengths, such as at both near field and infinity-focused image content.

SUMMARY OF INVENTION

It is an object of the present disclosure to advance the art of virtual image presentation when using compact head-mounted devices and similar imaging apparatus. Advantageously, embodiments of the present disclosure provide an optical imaging apparatus using two or more light guides that can form virtual images both at infinity and at near-field focus, while allowing visibility of the real-world scene content of the view.

These and other aspects, objects, features and advantages of the present invention will be more clearly understood and appreciated from a review of the following detailed description of the preferred embodiments and appended claims, and by reference to the accompanying drawings.

According to an aspect of the present disclosure, there is provided a composite prism including an external input face defined between outer edges of first and second internal beam splitter surfaces. A first set of external prism surfaces is configured to redirect a first portion of an input light beam that is at normal incidence on the input face to a first output face in a first output direction. A second set of external prism surfaces is configured to redirect a second portion of the input light beam to a second output face in a second output direction. The first and second output directions are symmetrically angularly offset with respect to the normal incidence of the input light beam.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

FIGS. 4A and 4B are schematic diagrams of portions of a dual imaging apparatus that show, in simplified form, the two different optical paths for infinity focus and near-field virtual images, respectively.

FIG. 14 is a perspective view that shows a display system for augmented reality viewing using imaging light guides of the present disclosure.

DETAILED DESCRIPTION OF THE INVENTION

Figure 1:
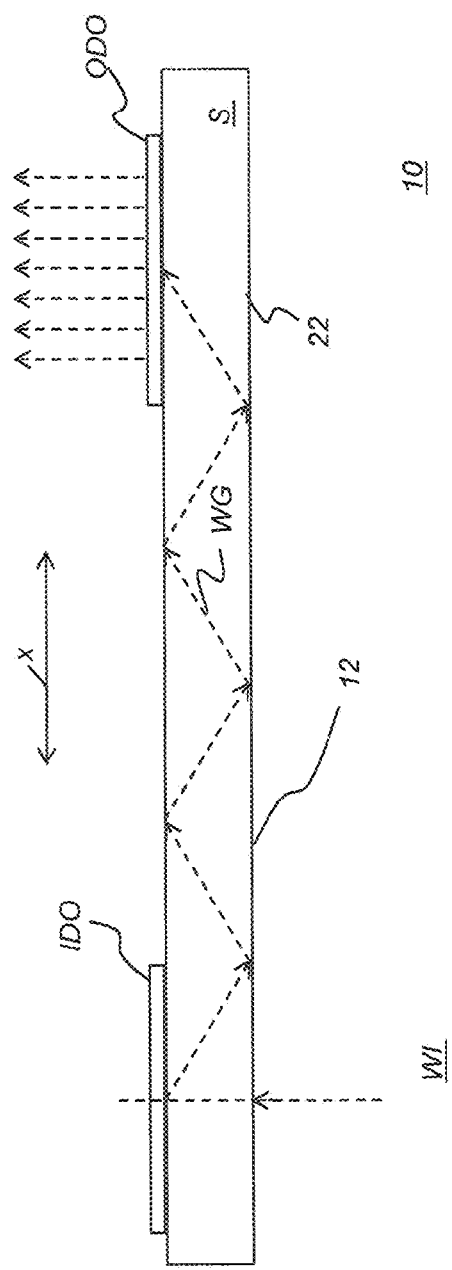
FIG. 1 is a schematic diagram that shows a simplified cross-sectional view of a diffractive pupil expander.

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise.

By "exemplary" is meant to be "an example of", not intended to suggest any preferred or ideal embodiment.

In the context of the present disclosure, the terms "viewer", "operator", "observer", and "user" are considered to be equivalent and refer to the person who wears and views images using the HMD viewing device.

As used herein, the term "energizable" relates to a device or set of components that perform an indicated function upon receiving power and, optionally, upon receiving an enabling signal.

The term "actuable" has its conventional meaning, relating to a device or component that is capable of effecting an action in response to a stimulus, such as in response to an electrical signal, for example.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the terms "wavelength band" and "wavelength range" are equivalent and have their standard connotation as used by those skilled in the art of color imaging and refer to a continuous range of light wavelengths that are used to represent polychromatic images. Different wavelength bands are directed through different color channels, such as to provide red, green, and blue primary colors in conventional color imaging applications.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. Virtual image display has a number of inherent advantages for augmented reality presentation. For example, the apparent size of a virtual image is not limited by the size or location of a display surface. Additionally, the source object for a virtual image may be small; a magnifying glass, as a simple example, provides a virtual image of its object. In comparison with systems that project a real image, a more realistic viewing experience can be provided by forming a virtual image that appears to be some distance away. Providing a virtual image also obviates any need to compensate for screen artifacts, as may be necessary when projecting a real image.

The phrase "optical infinity" as used herein corresponds to conventional usage in the camera and imaging arts, indicating image formation using substantially collimated light, so that the focus distance exceeds at least about 8-10 m.

In the context of the present disclosure, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus. The terms "beam expander" and "pupil expander" are considered to be synonymous, used interchangeably herein.

A composite prism is formed from two or more component prism elements that are glued or otherwise coupled together, including those in optical contact, and including composite elements that are mechanically coupled but have a thin gap at the interface between them, wherein the gap is a fixed distance and is filled with air or epoxy, for example.

FIG. 1 is a schematic diagram that shows a simplified cross-sectional view of one conventional configuration of a monocular type diffractive beam expander or exit pupil expander 10 formed as an imaging light guide 22 comprising an input coupling element such as an in-coupling diffractive optic IDO, and an output coupling element, such as an out-coupling diffractive optic ODO arranged on a transparent and planar waveguide or imaging light guide substrate S, alternately termed pupil expander substrate S. In this example, in-coupling diffractive optic IDO is shown as a reflective type diffraction grating; however, in-coupling diffractive optic IDO could alternately be a transmissive diffraction grating, volume hologram or other holographic diffraction element, or other type of optical component that provides diffraction for the incoming, image-bearing light, arranged on a lower surface 12 of the pupil expander substrate S, where the in-coming light beam WI first interacts with the pupil expander substrate S.

When used as a part of a virtual display system, in-coupling diffractive optic IDO couples the in-coming image-bearing light beam WI from an imager, via suitable front end optics (not shown), into the substrate S of imaging light guide 22. The input light is diffracted by in-coupling diffractive optic IDO. A portion of the first order diffracted light forms an imaging light guided light wave WG that propagates along the substrate S, moving toward the right in the FIG. 1 system, toward out-coupling diffractive optic ODO. Between gratings or other types of diffractive elements, light is channeled or directed through the imaging light guide by Total Internal Reflection (TIR). Out-coupling diffraction element ODO contributes to beam expansion, along the x-axis in the view of FIG. 1, and couples the light that it receives through substrate S, directing the light outwards, towards the observer.

Figure 2:
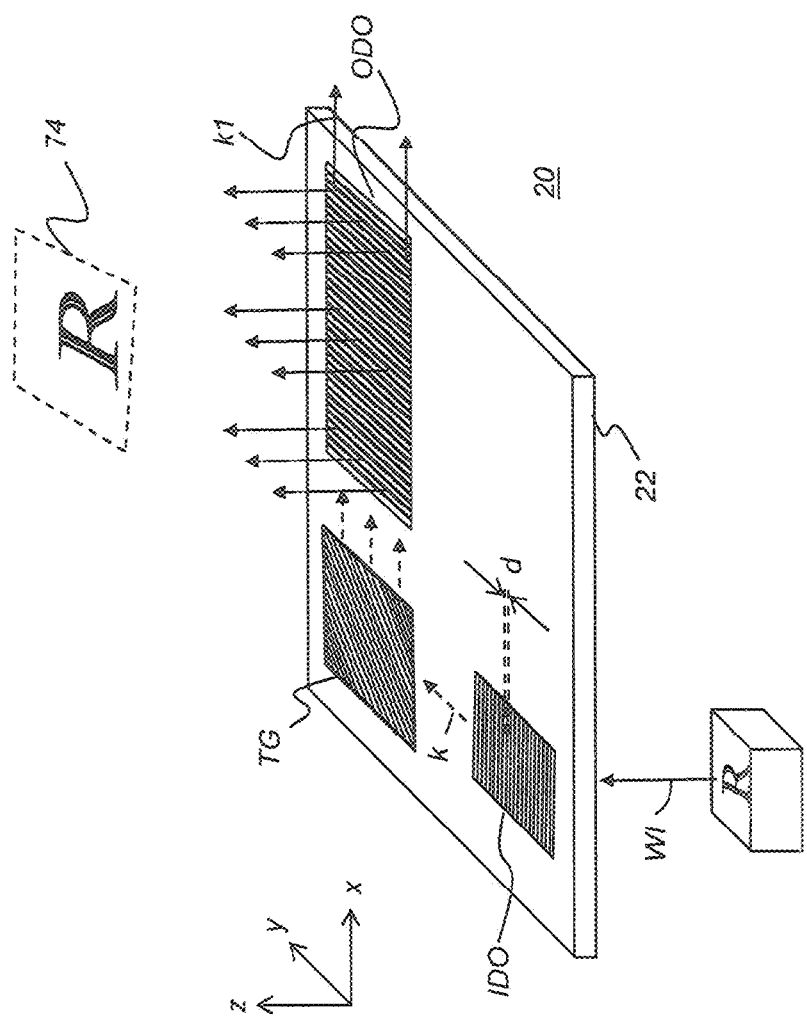
FIG. 2 is a perspective view that shows a diffractive pupil expander with a turning grating.

The perspective view of FIG. 2 shows a conventional pupil expander 20 that is configured as an imaging light guide and that provides beam expansion along x- and y-axes of the intended image using an intermediate turning grating TG to redirect the light output (first diffracted mode) from in-coupling diffractive optic IDO to out-coupling diffractive optic ODO according to the TG grating vector.

In the FIG. 2 device, in-coupling diffractive optic IDO containing periodic rulings with a period d receives incoming input optical beam WI representing one of a plurality of pixel generated by an image source 16. A full range of angularly encoded beams for producing a virtual image can be generated by a real display together with focusing optics, by a beam scanner for more directly setting the angles of the beams, or by a combination such as a one-dimensional real display used with a scanner. Pupil expander 20 provides an expanded output beam from out-coupling diffractive optic ODO by using intermediate grating TG. Intermediate grating TG provides beam expansion in the y-axis direction and has an angular orientation of diffractive optics and a spacing geometry determined by spacing period d periodicity and the difference in angle of the diffraction features between diffractive optic IDO and diffractive optic ODO.

In considering a light guide design used for imaging it should be noted that image-bearing light traveling within a imaging light guide such as a conventional waveguide is effectively encoded by the in-coupling optics, whether the in-coupling mechanism uses gratings, holograms, prisms, mirrors, or some other mechanism. Any reflection, refraction, and/or diffraction of light that takes place at the input must be correspondingly decoded by the output in order to re-form the virtual image that is presented to the viewer. Out-coupling diffractive optic ODO directs the image-bearing light to an eyebox, shown schematically as eyebox 74 in FIG. 2. The letter "R" represents the orientation of the virtual image that is formed so that it is visible to the viewer whose eyes are in proximity to eyebox 74.

A turning grating TG, placed at an intermediate position between the input and output diffraction elements, is typically chosen so that it does not induce any change on the encoded light. If, for example, the pitch of the turning grating matches the input and output diffraction elements, it is oriented at 60 degrees to the input and output diffraction elements in such a way that the encoded ray bundles are turned 120 degrees by one of the 1st reflection orders of the diffraction elements. This diffraction only acts on the vector component of the incoming rays that are parallel to the grating vector of the turning grating TG. This is evident by the fact that such turning gratings redirect ray bundles within the guide substrate, but do not change the encoded angular information of the virtual image. The resultant virtual image in such a designed system is not rotated. Further, if such a system did introduce any rotation to the virtual image, it would do so non-uniformly across different field angles and wavelengths of light, thus causing unwanted distortions or chromatic aberrations in the resultant virtual image.

The use of turning grating TG provides an inherent geometrical accuracy to the design of pupil expander 20 so that the input beam and output beam are symmetrically oriented with respect to each other. With proper grating TG spacing and orientation, grating vectors k direct the light from the in-coupling diffractive optic IDO to the out-coupling diffractive optic ODO with grating vector k1. Grating vectors extend in a direction that is normal to the grooves of the diffraction grating and with a magnitude inverse to the pitch (distance between grooves). Image symmetry is shown for an image of the letter 'R' in FIG. 2. It should be noted that the image that is formed for the imaging light guide viewer is a virtual image, typically focused at infinity, but with the relative orientation of output image content to input image content as represented in FIG. 2. A change in the rotation about the z axis or angular orientation of incoming light wave WI with respect to the x-y plane causes a corresponding symmetric change in rotation or angular orientation of outgoing light from out-coupling diffractive optic (ODO). From the aspect of image orientation, turning grating TG simply acts as a type of optical relay, providing magnification along one axis of the image that is input at in-coupling diffractive optic IDO to out-coupling diffractive optic (ODO). Turning grating TG is typically a slanted or square grating or, alternately, can be a blazed grating.

Beam expansion in two different dimensions is provided when using the arrangement of FIG. 2. Turning grating TG expands the diffracted beam from in-coupling diffractive optic IDO in the y direction as shown. Out-coupling diffractive optic ODO further expands the diffracted beam in the x direction, orthogonal to the y direction as shown.

The conventional imaging light guide pupil expander 20 that is shown in FIGS. 1 and 2 is used in a number of existing head-mounted device (HMD) designs for providing image content to a viewer. This type of pupil expander is particularly well-suited to augmented reality applications in which image content can be superimposed on a real-world view as seen through the transparent imaging light guide.

Figure 3:
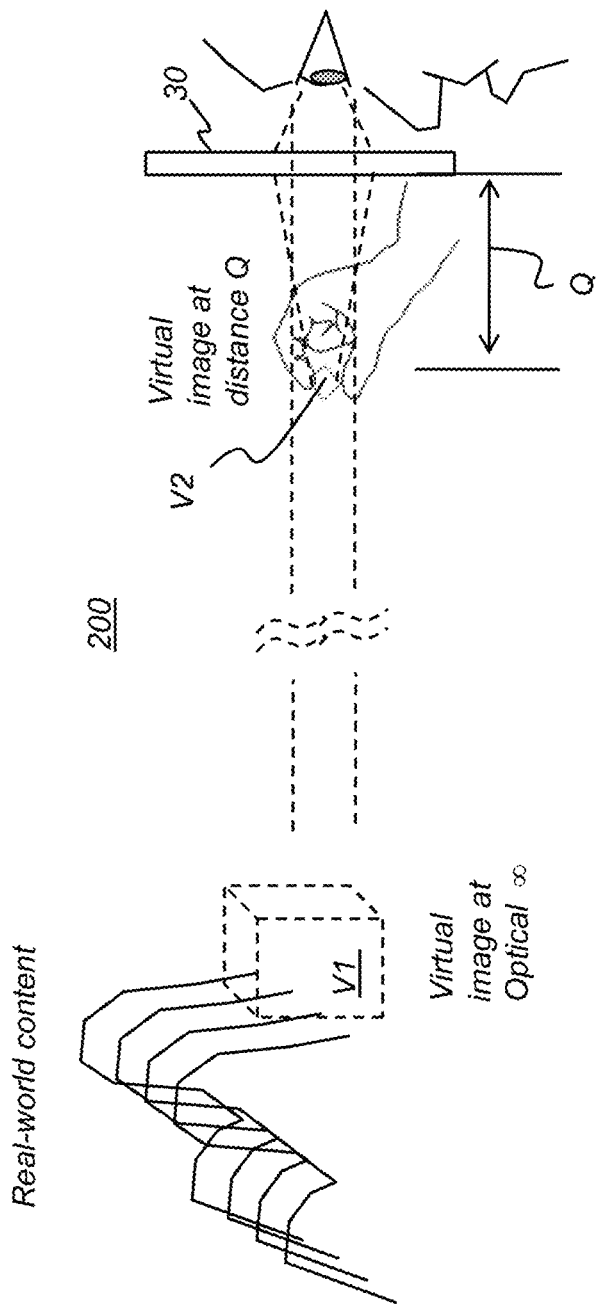
FIG. 3 is a perspective view that shows a dual imaging apparatus having a pupil expander that forms two virtual images at different focal distances

Conventional pupil expanders using an imaging light guide form a virtual image from collimated light, so that the image appears at optical infinity focus. It has been recognized that there can be advantages in forming additional virtual image content that appears to be at a shorter focus distance. Referring to the schematic diagram in FIG. 3, there is shown a dual imaging apparatus 200 having a pupil expander 30 that forms two virtual images: an infinite focused or far-field virtual image V1 at infinity, and a near field virtual image at a finite focal distance Q, such as at 0.6 m from the pupil expander 30, for example. This dual-image system allows the viewer to view both far-field (infinity) and near-field content for different images, along with ambient real-world image content. The visual scene content or real-world image content, also termed the ambient view, is visible to the viewer in an augmented reality system.

Figure 4B:
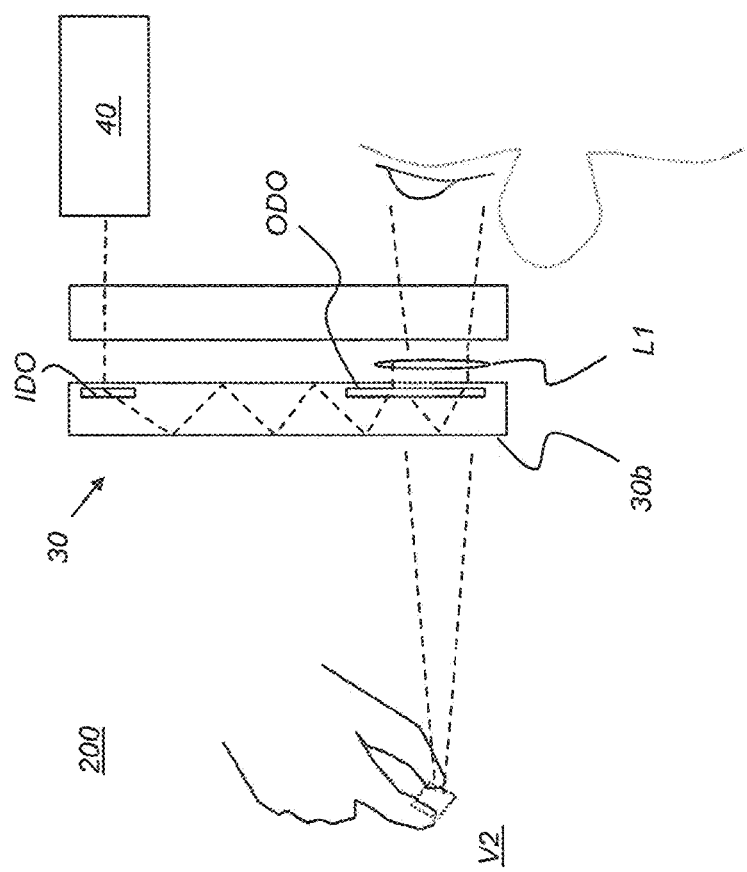

FIGS. 4A and 4B are schematic diagrams of portions of dual imaging apparatus 200 that show, in simplified form, the two different optical paths for infinity focus and near-field virtual images, respectively. For the infinity focused image of FIG. 4A, a projector 40 directs infinity focused image light into a pupil expander 30a through in-coupling diffractive optic IDO This light is conveyed to out-coupling diffractive optic ODO, as described with reference to FIGS. 1 and 2, to form the virtual image V1 at optical infinity. The near-field focused image is formed in similar fashion as shown more particularly in FIG. 4B. Projector 40 directs infinity focused image light into a pupil expander 30b that conveys the light from IDO to ODO to provide the near-field image content. Additional optics, shown schematically as a lens L1 in the simplified schematic of FIG. 4B, are used to provide the alternate near-field focus for the generated near-field virtual image V2. The function of lens L1 can be provided in any of a number of ways, as described in more detail subsequently.

Figure 5:
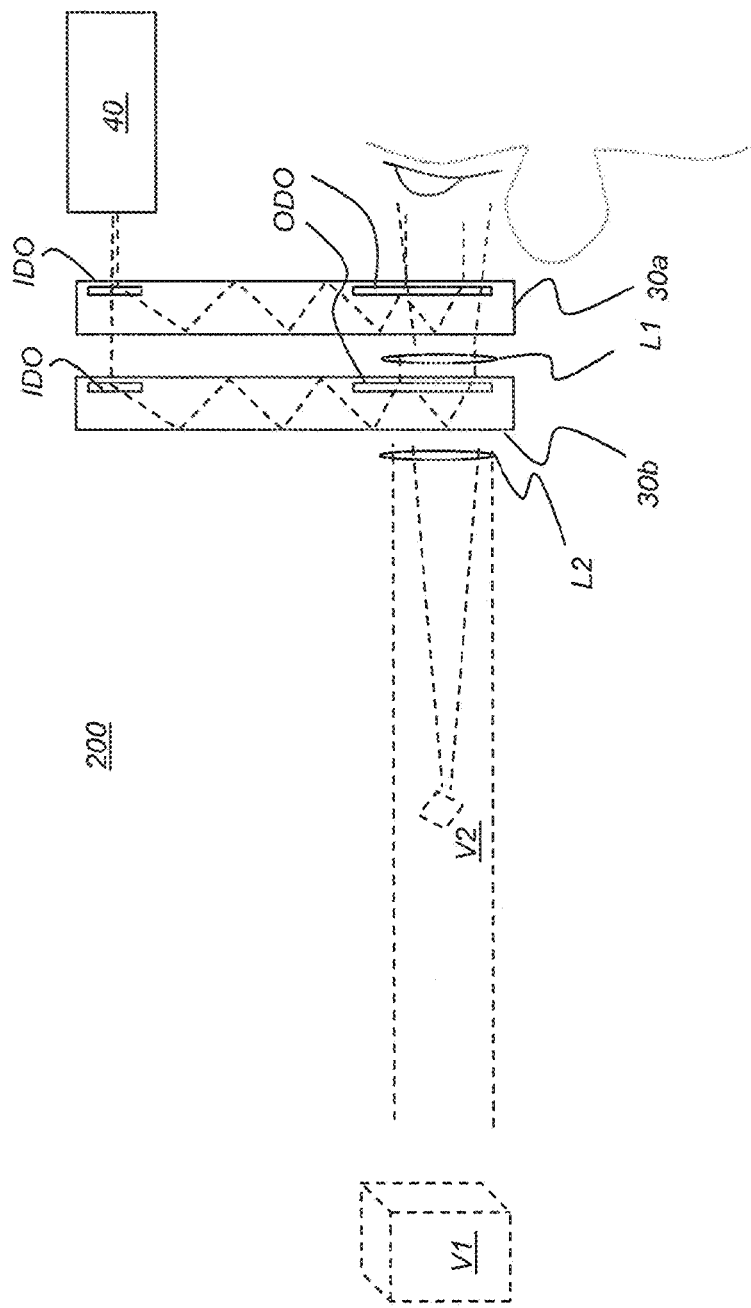
FIG. 5 is a schematic diagram that shows a dual imaging apparatus with two optical paths.

The schematic diagram of FIG. 5 shows dual imaging apparatus 200 with both optical paths overlaid on each other, one path for infinity focus for virtual image V1 using pupil expander 30a, the other for near-field focus for virtual image V2 using pupil expander 30b. An additional optional optic, shown as lens L2, helps to correct the change in focus of the ambient view or visual scene content that would otherwise be caused by lens L1. Additional lenses can also be provided, such as vision correcting lenses for the viewer. Lenses can be Fresnel lenses or holographic lenses, advantaged over conventional glass lenses by being uniformly thin.

Figure 6:
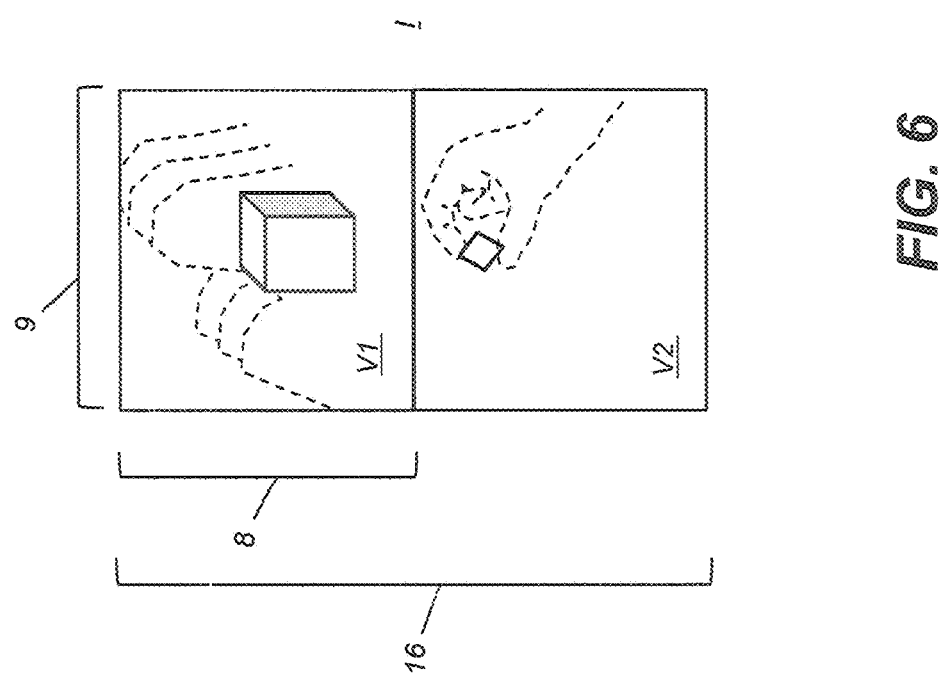
FIG. 6 is a schematic view showing two spatially separable image-bearing portions of an output beam from the projector.

Embodiments of the present disclosure can use a single projector for forming both near- and far-field image content. In order to provide this function, the two images, formed side-by-side, must be spatially or, alternately, temporally separable from each other. Using the arrangement shown in FIG. 6, the projected image I has the overall aspect ratio commonly used for HDTV (high-definition television) as well as proprietary HDMI (High-definition multimedia interface) display, represented as a 9×16 rectangle. Where this is the case, the image content for image V1 at infinity focal distance uses one half of the projected beam, a rectangle having about a 9×8 aspect ratio. The image content for the alternate image V2 at finite focal length uses the other half of the projected beam of light.

Figure 7:
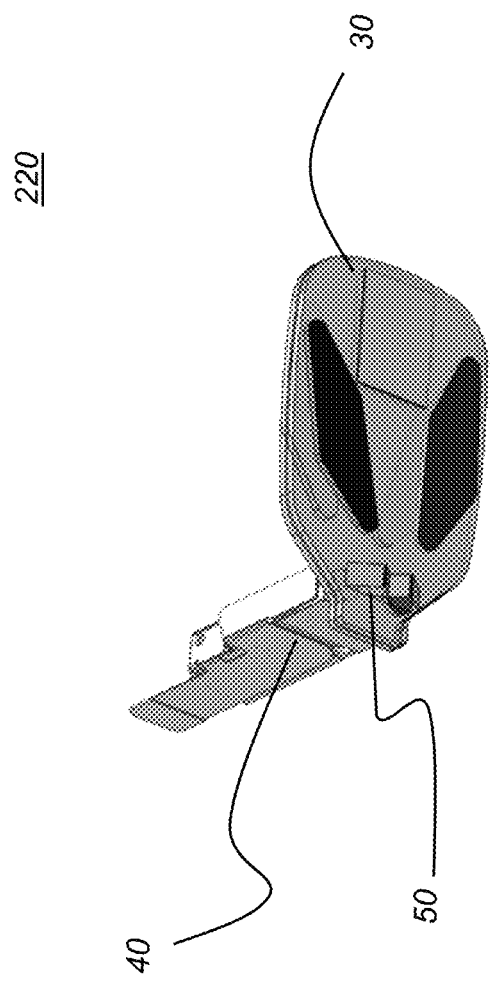
FIG. 7 is a front perspective view that shows a dual image apparatus having a single projector.

FIG. 7 is a front perspective view that shows dual image apparatus 220. For these embodiments, projector 40 is oriented to lie flat along the temple of the viewer when the apparatus 220 is worn. A composite prism acts as a beam separator 50 for splitting the projected beam into its separate parts for images V1 and V2, as described in more detail subsequently.

Figure 8:
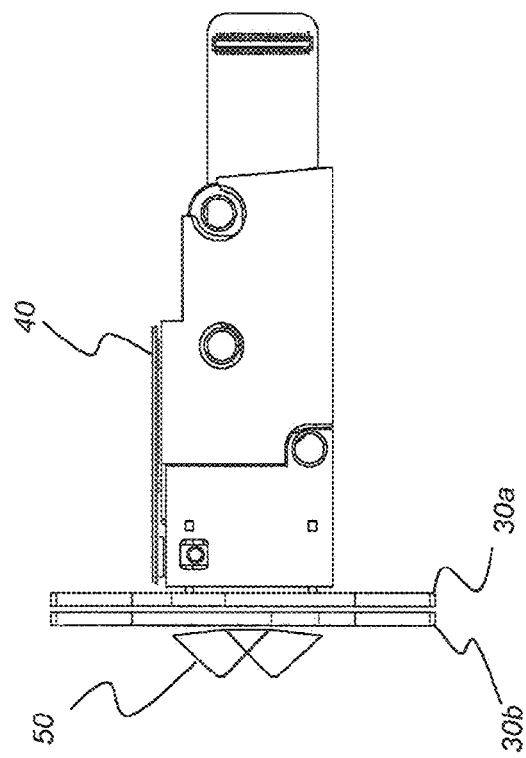
FIG. 8 is a side view showing the components of an imaging apparatus for two images at different focal lengths.

FIG. 8 is a side view showing the components of dual imaging apparatus 220 for displaying two images at different focal lengths.

Figure 9:
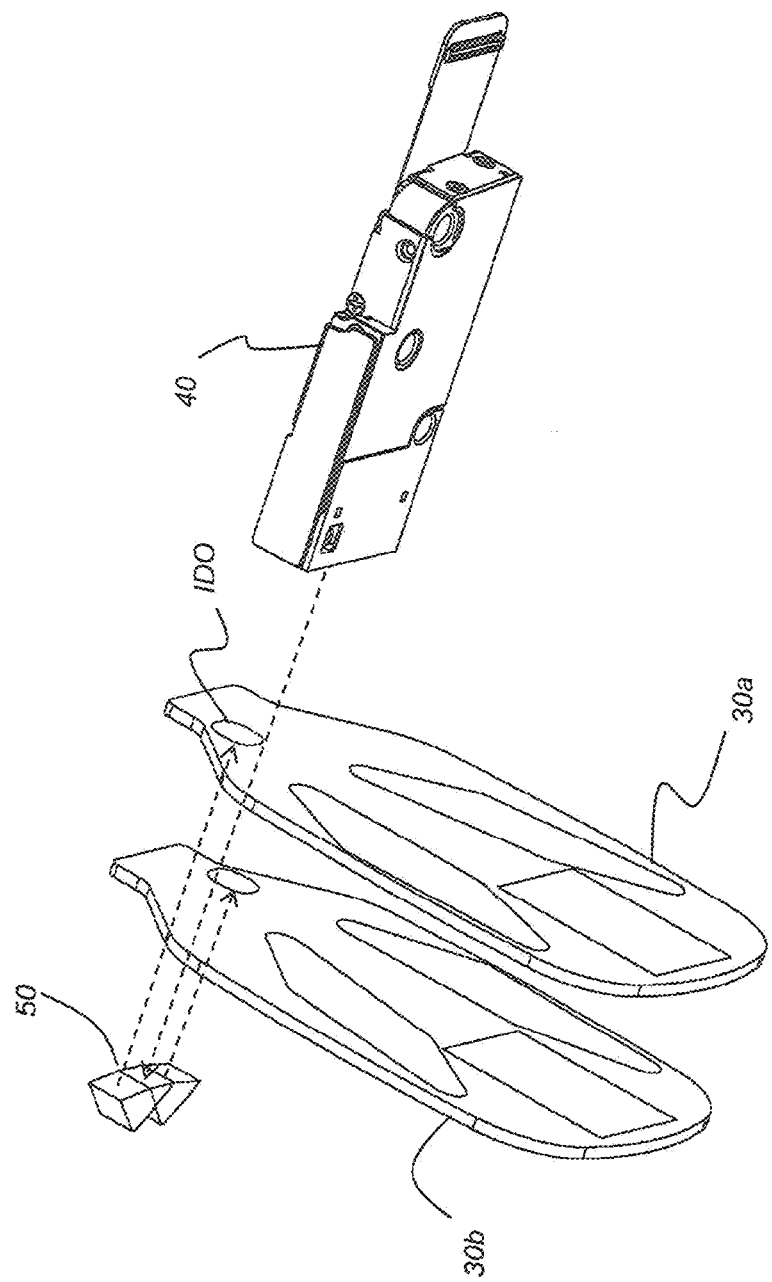
FIG. 9 is an exploded view that shows features of an imaging apparatus for two images at different focal lengths.

FIG. 9 is an exploded view that shows features of an imaging apparatus for forming two images at different focal lengths. Dashed lines indicate the paths of light generated from projector 40. Projector 40 directs light in a first direction, forward or left-ward as shown in the example of FIG. 9. Beam separator 50 splits this projected light into two portions and directs each portion backward, in the direction opposite and parallel to the forward or projection direction. The portion intended for forming the far-field or infinity focused image is directed to the IDO on pupil expander 30a. The portion intended for forming the near-field focused image is directed back to the IDO on pupil expander 30b.

Figure 10:
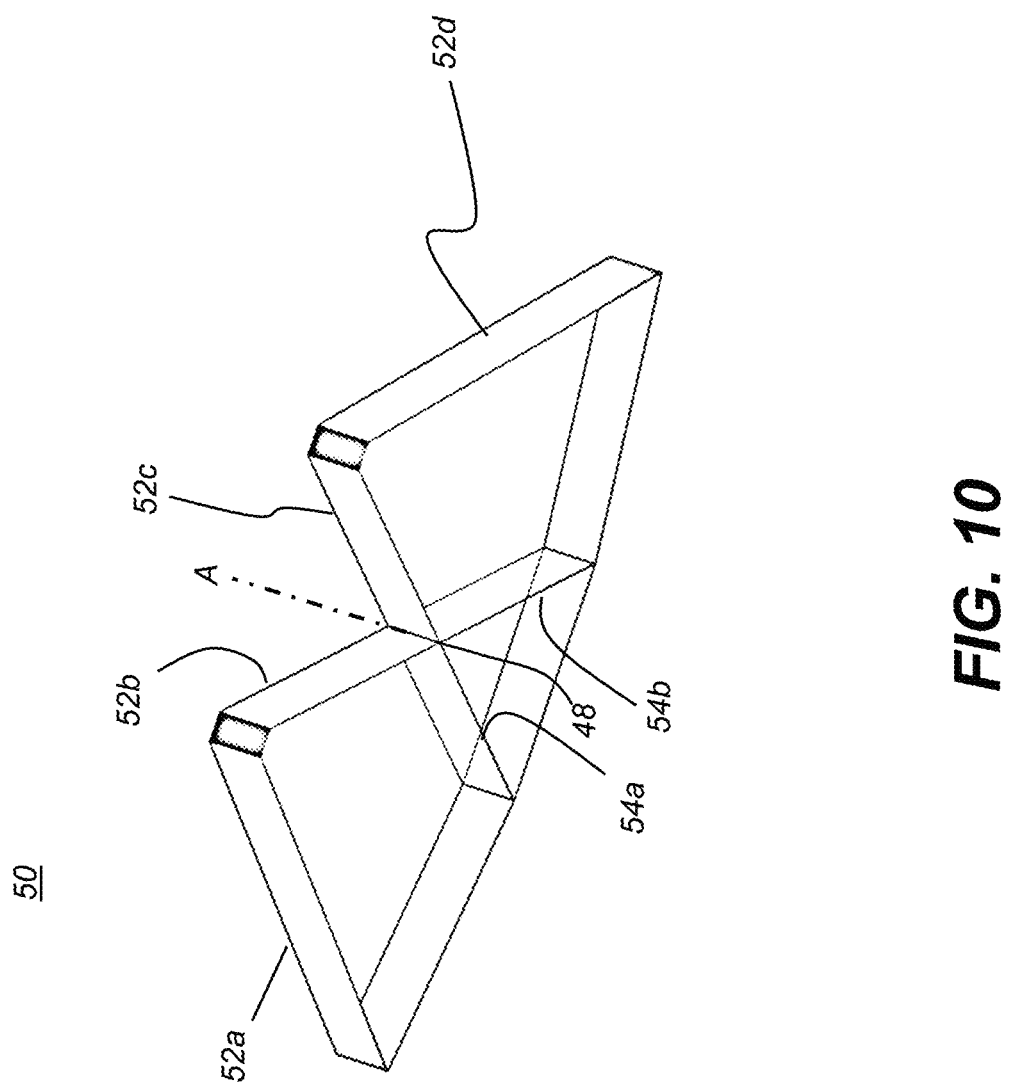
FIG. 10 is a schematic view showing surfaces of a composite prism for image splitting.
Figure 11:
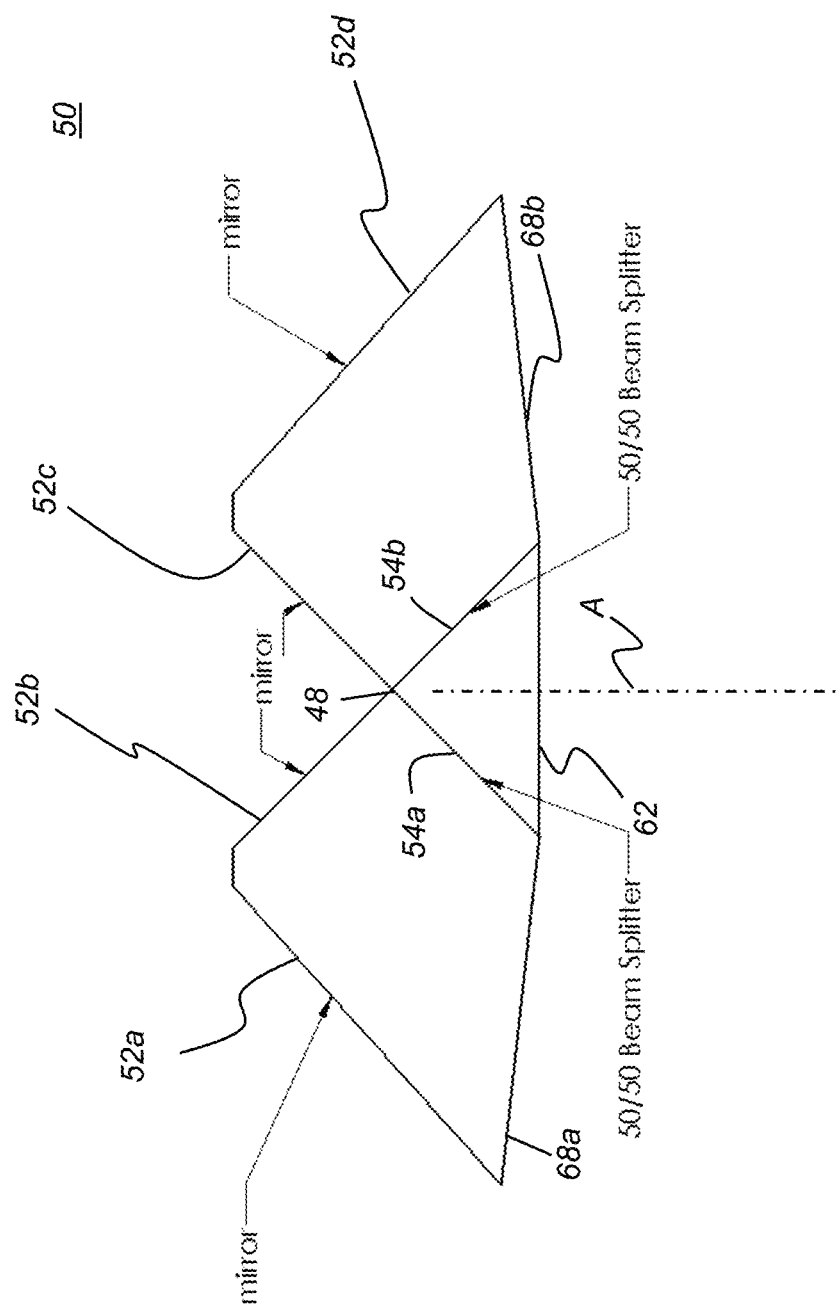
FIG. 11 is a side view that shows the arrangement of a composite prism for beam separation according to an embodiment of the present disclosure.
Figure 12:
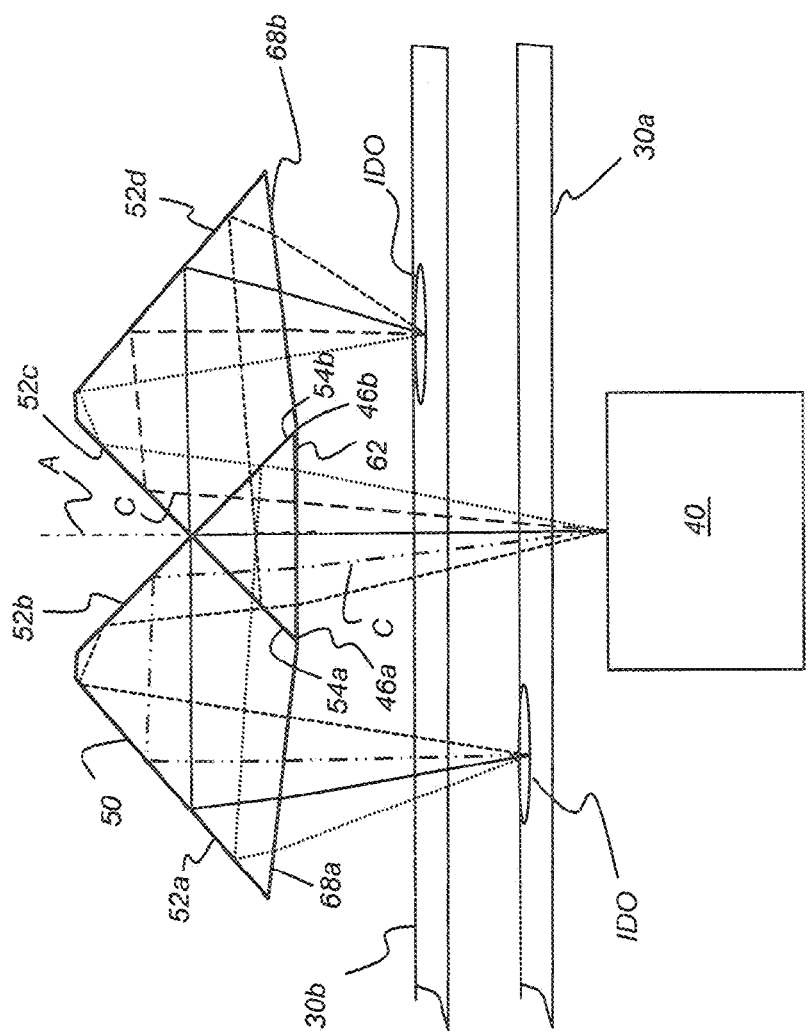
FIG. 12 is a schematic side view of the composite prism showing beam separation and redirection in opposite directions along separate light paths.

FIGS. 10, 11, and 12 show how beam separator 50 is formed and how it functions to separate light content for the two virtual images V1 and V2 according to an embodiment of the present disclosure. Where spatial separation is used, beam separator 50 is configured to handle and re-direct light for near- and far-field channels by splitting the signal along one direction. Where temporal separation is used, a shuttering device can be used to alternate between transmitting and blocking light to each optical path in repeated succession. Shuttering can use a mechanical shutter or can use electronically controlled switches to provide a blocked or un-blocked optical path.

FIG. 10 is a perspective view of a composite prism beam separator 50 for image-splitting. A composite prism is an optic formed as a combination of two or more component prisms that are optically coupled to each other and provide a light-directing function. Prism surfaces can be conditioned to filter or reflect light according to various optical characteristics. Typically, an optical adhesive is used to bond the component prisms together. The term "face" indicates an outer or external surface of the prism.

FIG. 11 is a schematic diagram that shows how separator 50 can be arranged for directing light to each IDO of dual imaging apparatus 220. The prism that forms beam separator 50 has four mirrored or reflective surfaces on the outside of the prism, 52a, 52b, 52c, and 52d and two inner beam splitter surfaces 54a and 54b internal to the prism. Each of inner beam splitter surfaces 54a and 54b provides a 50/50 beam splitter. Beam separator prism 50 beam splitter surfaces 54a and 54b intersect along an edge 48, with their intersection having a point lying along a central axis coincident with the projector axis A for received light from the projector. The defined projection axis is orthogonal to edge 48. Input surface 62 is disposed between outer edges of the internal beam splitter surfaces 54a, 54b. Each output surface 68a, 68b is offset from orthogonal to the defined projection axis A by at least 1 degree and both output faces are offset from parallel to each other by at least 2 degrees.

The schematic diagram of FIG. 12 shows how separator prism 50 splits the light from projector 40 and redirects the separated light backward, towards the respective IDO on each pupil expander 30a, 30b surface. The projected light passes through each of the pupil expanders 30a and 30b and is incident on surface 62. Chief rays are shown for the light that is directed to beam separator 50 and to the two in-coupling diffractive optics IDO. For each half of the projected image, the light that transmits through the corresponding internal 50/50 beam splitter surface 54a or 54b is directed back toward the corresponding IDO. The light redirected back from output surfaces 68a and 68b is symmetrically angularly offset with respect to the normal incidence of the input light beam. A central ray C is in parallel to the projection axis A and spaced apart from axis A, directed toward the corresponding IDO; other rays are angularly offset from the normal incidence angle. Efficiency of the directed light relates to its angle relative to a normal to the corresponding IDO. For light directed to each IDO, that portion of light that is over a range of angles closer to normal is more efficiently coupled through the IDO and thus is predominant in the light conveyed through the corresponding pupil expander. Light at angles further from normal to the IDO is less efficiently coupled to the corresponding beam expander. The different line styles in FIG. 12 show how opposite ends of the projected image are more or less efficiently coupled to each IDO. Some of the light at higher incident angles (more deviated from normal) may vignette or miss the IDO entirely.

Referring to the right side of beam separator 50 of FIG. 12, reflective surfaces 52c and 52d define a light path that directs a central ray C of that portion of the incident projected light that transmits through beam splitter surface 54b through an output surface 68b, in a direction opposite and parallel to axis A, and spaced apart from the incident projected light beam. A corresponding light path is similarly defined by reflective surfaces 52a and 52b for providing the alternate portion of light with a central ray C that is parallel and opposite the projected light axis A. Light redirected back from output surfaces 68a and 68b is symmetrically angularly offset with respect to the normal incidence of the input light beam. Reflection from surfaces can result from use of a dichroic coating, a reflective coating, or total internal reflection (TIR).

Using separator prism as beam separator 50, the two generated images can be centered differently. For example, with a full field of view of 25 degrees in the longer direction, each half forms a separate 12.5 degrees field of view image.

Figure 13:
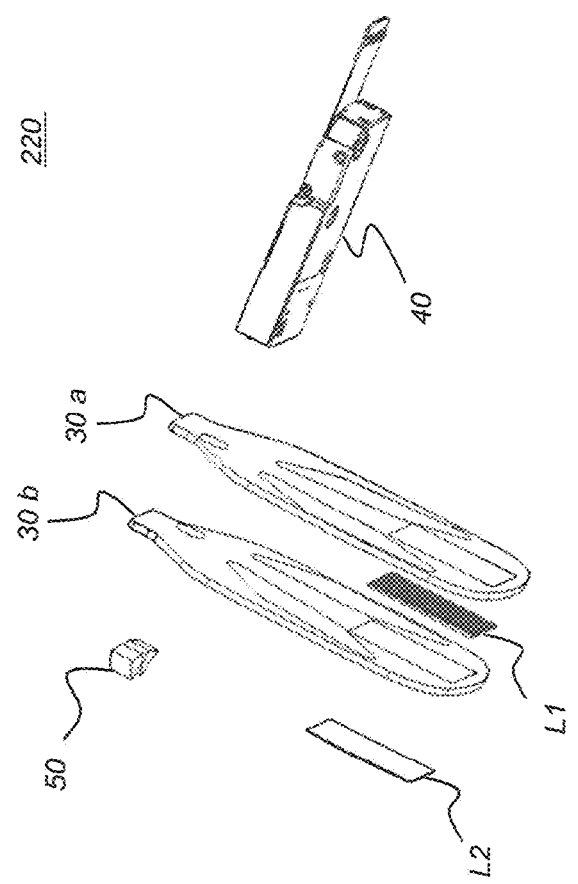
FIG. 13 is an exploded view that shows features of an imaging apparatus for two images at different focal lengths according to an alternate embodiment of the present disclosure.

FIG. 13 is an exploded view that shows a dual imaging apparatus 220 according to an optional embodiment of the present disclosure. Additional optics, shown schematically as a lens L1 in the simplified schematic of FIG. 4B, are used to provide the alternate near-field focus for the generated near-field virtual image V2. The function of lens L1 can be provided in any of a number of ways, including being provided by a diffractive element formed in the diffractive grating structure or using holography. An additional optic, shown as lens L2, helps to correct for distortion to the ambient view that would otherwise be caused by lens L1. Additional lenses can also be provided, such as vision correcting lenses for the viewer. Lenses can be Fresnel lenses or holographic lenses, advantaged over conventional glass lenses by being uniformly thin.

It should be noted that the two virtual images that are formed by dual imaging apparatus 220 are at different focal lengths. An embodiment of the present disclosure provides two focal lengths, where neither focal length is considered at optical infinity.

The perspective view of FIG. 14 shows a display system 60 for three-dimensional (3-D) augmented reality viewing using a pair of imaging light guides of the present disclosure. Display system 60 is shown as an HMD with a left-eye optical system 64l having a pupil expander 140l for the left eye and a corresponding right-eye optical system 64r having a pupil expander 140r for the right eye. An image source 152, such as a picoprojector or similar device, can be provided, energizable to generate a separate image for each eye, formed as a virtual image with the needed image orientation for upright image display. The images that are generated can be a stereoscopic pair of images for 3-D viewing. The virtual image that is formed by the optical system can appear to be superimposed or overlaid onto the real-world scene content seen by the viewer. Additional components familiar to those skilled in the augmented reality visualization arts, such as one or more cameras mounted on the frame of the HMD for viewing scene content or viewer gaze tracking, can also be provided. Alternate arrangements are possible, including a display apparatus for providing an image to one eye.

Pupil Expander Fabrication

In-coupling and out-coupling diffractive optics IDO and ODO can be diffraction gratings or formed as volume holograms, or formed from a holographic polymer dispersed liquid crystal, for example. The waveguide substrate S of the pupil expander is typically glass or other optical material with sufficient index of refraction for supporting TIR transmission between in-coupling diffractive optic, distribution gratings, and out-coupling diffractive optic.

In-coupling diffractive optics IDO, distribution gratings, and out-coupling diffractive optics ODO can have different grating periods appropriate to their functions. After proper surface preparation of a glass substrate blank, the diffraction components can formed on one or both outer surfaces of the pupil expander using nano-imprinting methods, for example. At least one of the in-couplings and out-couplings can be a surface relief diffraction grating.

The invention has been described in detail with particular reference to presently preferred embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An imaging apparatus comprising:
a projector that projects a beam of light along a projection axis through a first and a second pupil expander, the beam having a first image portion and a second image portion; and
a beam separator that reflects both first and second image portions of the projected beam back towards the first and second pupil expanders;
wherein the first pupil expander is further configured to direct the reflected light forming the first image portion to form a first virtual image to a viewer; and
wherein the second pupil expander is further configured to direct the reflected light forming the second image portion to form a second virtual image to the viewer.

2. The apparatus of claim 1 wherein the first pupil expander further comprises a first diffractive input optic disposed in the path of the first image portion reflected from the beam separator and the second pupil expander further comprises a second diffractive input optic disposed in the path of the second image portion reflected from the beam separator.

3. The apparatus of claim 1 further comprising one or more lenses disposed between the first and second pupil expanders in the path of the light forming the second virtual image so that the first and second virtual images are formed at different distances from the viewer.

4. The apparatus of claim 3 wherein the first virtual image is at optical infinity.

5. The apparatus of claim 1 wherein the beam separator is a composite prism.

6. The apparatus of claim 1 further comprising a shutter that alternately blocks a portion of the reflected light from the projector.

7. The apparatus of claim 1 wherein the first and second pupil expanders lie between the projector and the beam separator.

8. The apparatus of claim 1 wherein the beam separator has beam splitter surfaces that intersect along an edge, and the projection axis is oriented orthogonal to the edge.

9. The apparatus of claim 1 wherein the beam separator has first and second output faces and wherein each output face is offset from orthogonal to the projection axis by at least 1 degree and wherein both output faces are offset from parallel to each other by at least 2 degrees.

10. The apparatus of claim 9 wherein an edge of the beam separator orthogonally intersects the projection axis.

11. An imaging apparatus comprising:
a projector that projects a beam of light having a first portion that forms a first image and a second portion that forms a second image,
wherein the light in the first portion of the projected beam and forming the first image is spatially or temporally separable from the light in the second portion of the projected beam and forming the second image;
a first pupil expander in the path of the projected light beam and further in the path of a first reflected light beam in the reverse direction, wherein the first pupil expander forms a first virtual image to a viewer;
a second pupil expander in the path of the projected light beam and further in the path of a second reflected light beam in the reverse direction, wherein the second pupil expander forms a second virtual image; and
a beam separator disposed to reflect the projected beam to form first and second reflected light beams directed towards the first and second pupil expanders.

12. The apparatus of claim 11 further comprising one or more lenses disposed between the first and second pupil expanders in the path of the first and second reflected light beams so that the first and second virtual images are formed at different distances from the viewer.

13. The apparatus of claim 11 in which the beam separator comprises:
first and second beam splitter surfaces that intersect along an edge,
first and second reflective surfaces that extend outward from the edge of intersection of the first and second beam splitter surfaces, and third and fourth reflective surfaces spaced apart from the first and second beam splitter surfaces;

wherein the first and third reflective surfaces provide for reflecting the first reflected light beam back to the first pupil expander and the second and fourth reflective surfaces provide for reflecting the second reflected light beam back to the second pupil expander.

14. The apparatus of claim 13 in which the projector is arranged to project the beam of light along a projection axis that is oriented orthogonal to the edge along with the first and second beam splitters intersect.

15. The apparatus of claim 13 in which the beam separator further comprises first and second output faces and wherein each output face is offset from orthogonal to the defined projection axis by at least 1 degree and wherein both output faces are offset from parallel to each other by at least 2 degrees.

16. The apparatus of claim 13 in which the beam separator is formed as a composite prism, wherein the first and second beam splitter surfaces are internal to the prism and the first, second, third, and fourth reflective surfaces are external surfaces of the composite prism.

17. The apparatus of claim 11 wherein the first and second pupil expanders lie between the projector and the beam separator.

18. The apparatus of claim 17 wherein the first and second pupil expanders further comprise respective diffractive input optics disposed in the paths of the respective first and second reflected light beams from the beam separator.

* * * * *